US008944398B1

(12) United States Patent
Miller

(10) Patent No.: US 8,944,398 B1
(45) Date of Patent: Feb. 3, 2015

(54) PORTABLE LIFT FACILITATING ASSEMBLY

(71) Applicant: Carol D. Miller, Bronx, NY (US)

(72) Inventor: Carol D. Miller, Bronx, NY (US)

( * ) Notice: Subject to any disclaimer, the term of this patent is extended or adjusted under 35 U.S.C. 154(b) by 0 days.

(21) Appl. No.: 13/939,257

(22) Filed: Jul. 11, 2013

(51) Int. Cl.
*F16M 13/00* (2006.01)
*A61G 5/14* (2006.01)

(52) U.S. Cl.
CPC .......................................... *A61G 5/14* (2013.01)
USPC ...... 248/421; 248/550; 248/396; 297/344.12; 297/344.15; 108/96; 108/106; 108/116

(58) Field of Classification Search
USPC ................. 248/421, 550, 396, 157, 688, 564, 248/162.1, 588, 420, 419, 423; 296/68.1; 297/344.12, 344.13, 344.14, 344.15, 297/344.16, 344.18, 344.19, 344.2; 108/96, 108/106, 110, 116, 132, 133, 144.11, 146
See application file for complete search history.

(56) References Cited

U.S. PATENT DOCUMENTS

| | | | | | |
|---|---|---|---|---|---|
| 655,598 | A | * | 8/1900 | Borchert | 248/588 |
| 1,124,769 | A | * | 1/1915 | McLeod | 190/12 R |
| 1,647,247 | A | * | 11/1927 | Pallenberg | 248/588 |
| 1,769,434 | A | * | 7/1930 | Jones | 248/580 |
| 1,836,353 | A | * | 12/1931 | Withrow | 248/574 |
| 1,981,285 | A | * | 11/1934 | Rechlicz | 248/421 |
| 2,850,203 | A | * | 9/1958 | Eurey | 312/306 |
| 2,968,818 | A | * | 1/1961 | Petersen | 5/246 |
| 3,137,473 | A | * | 6/1964 | Augunas | 248/419 |
| 3,165,351 | A | * | 1/1965 | Clancy et al. | 296/65.05 |
| 3,184,227 | A | * | 5/1965 | Viall, Sr. | 267/108 |
| 3,381,329 | A | * | 5/1968 | Wied | 15/327.2 |
| 3,401,968 | A | * | 9/1968 | Testa et al. | 292/127 |
| 3,741,512 | A | * | 6/1973 | Olsson | 248/585 |
| 3,874,626 | A | * | 4/1975 | Gross et al. | 248/562 |
| 4,007,925 | A | * | 2/1977 | DeRyke et al. | 271/160 |
| 4,565,343 | A | * | 1/1986 | Lake et al. | 248/346.06 |
| 4,688,851 | A | * | 8/1987 | Whiteford | 297/313 |
| 4,764,075 | A | * | 8/1988 | Cox et al. | 108/136 |
| 4,778,216 | A | * | 10/1988 | Stupakis | 297/17 |
| 4,929,025 | A | * | 5/1990 | Lu | 297/452.51 |
| 4,934,162 | A | * | 6/1990 | Rasch | 70/69 |
| 4,969,624 | A | * | 11/1990 | Ustelentsev et al. | 248/550 |
| 4,981,215 | A | * | 1/1991 | Ilic | 206/521 |
| 5,004,206 | A | * | 4/1991 | Anderson | 248/585 |
| 5,037,155 | A | * | 8/1991 | Holm et al. | 296/65.13 |
| 5,116,016 | A | * | 5/1992 | Nagata | 248/578 |
| 5,116,100 | A | | 5/1992 | Iversen | |
| 5,222,709 | A | * | 6/1993 | Culley et al. | 248/421 |
| 5,273,260 | A | * | 12/1993 | Nagata | 267/131 |
| 5,316,370 | A | | 5/1994 | Newman | |
| 5,333,931 | A | | 8/1994 | Weddendorf | |
| 5,398,620 | A | * | 3/1995 | Rouch | 108/1 |
| 5,632,209 | A | * | 5/1997 | Sakakibara | 108/145 |
| 5,671,830 | A | * | 9/1997 | Wood | 190/101 |
| 5,771,816 | A | * | 6/1998 | Zaguroli, Jr. | 108/147 |
| 5,799,922 | A | * | 9/1998 | Timms et al. | 248/564 |

(Continued)

*Primary Examiner* — Nkeisha Smith

(57) ABSTRACT

A portable lift facilitation assembly assists in lifting a person from a seated position. The assembly includes a base and a top. A biasing member urges the top away from the base into an extended position. Extension arms are coupled to the base and the top. Each extension arm is extendable between a retracted position and an elongated position. A latch is coupled to the base and selectively secures the top to the base. A release is coupled to the base and operationally coupled to the latch for selectively releasing the latch from the top wherein the biasing member urges the top into the extended position.

11 Claims, 4 Drawing Sheets

(56) References Cited

U.S. PATENT DOCUMENTS

| | | | | |
|---|---|---|---|---|
| 5,876,085 | A * | 3/1999 | Hill | 296/65.02 |
| D407,570 | S | 4/1999 | Frauenberger | |
| 6,113,188 | A * | 9/2000 | Stewart et al. | 297/339 |
| 6,427,607 | B1 * | 8/2002 | Palmer | 108/43 |
| 6,637,818 | B2 * | 10/2003 | Williams | 297/330 |
| 6,702,083 | B2 | 3/2004 | Jacobson | |
| 6,895,789 | B2 * | 5/2005 | Masseth et al. | 70/63 |
| 7,322,569 | B2 * | 1/2008 | Kraus | 267/136 |
| 7,484,805 | B2 * | 2/2009 | Baum | 297/344.15 |
| 8,091,842 | B2 * | 1/2012 | Thomas et al. | 248/125.8 |
| 8,160,475 | B2 * | 4/2012 | Atwood et al. | 399/110 |
| 8,292,368 | B1 * | 10/2012 | Yarbrough | 297/344.12 |
| 8,303,037 | B2 * | 11/2012 | Weber et al. | 297/344.15 |
| 8,480,117 | B2 * | 7/2013 | Purdy | 280/651 |
| 8,622,363 | B2 * | 1/2014 | Ellerich | 248/421 |
| 2011/0226930 | A1 * | 9/2011 | Enns et al. | 248/569 |
| 2011/0284713 | A1 * | 11/2011 | Ellerich | 248/421 |

* cited by examiner

PORTABLE LIFT FACILITATING ASSEMBLY

BACKGROUND OF THE DISCLOSURE

Field of the Disclosure

The disclosure relates to lift facilitating devices and more particularly pertains to a new lift facilitating device for assisting in lifting a person from a seated position.

SUMMARY OF THE DISCLOSURE

An embodiment of the disclosure meets the needs presented above by generally comprising a base and a top. A biasing member urges the top away from the base into an extended position. Extension arms are coupled to the base and the top. Each extension arm is extendable between a retracted position and an elongated position. A latch is coupled to the base and selectively secures the top to the base. A release is coupled to the base and operationally coupled to the latch for selectively releasing the latch from the top wherein the biasing member urges the top into the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
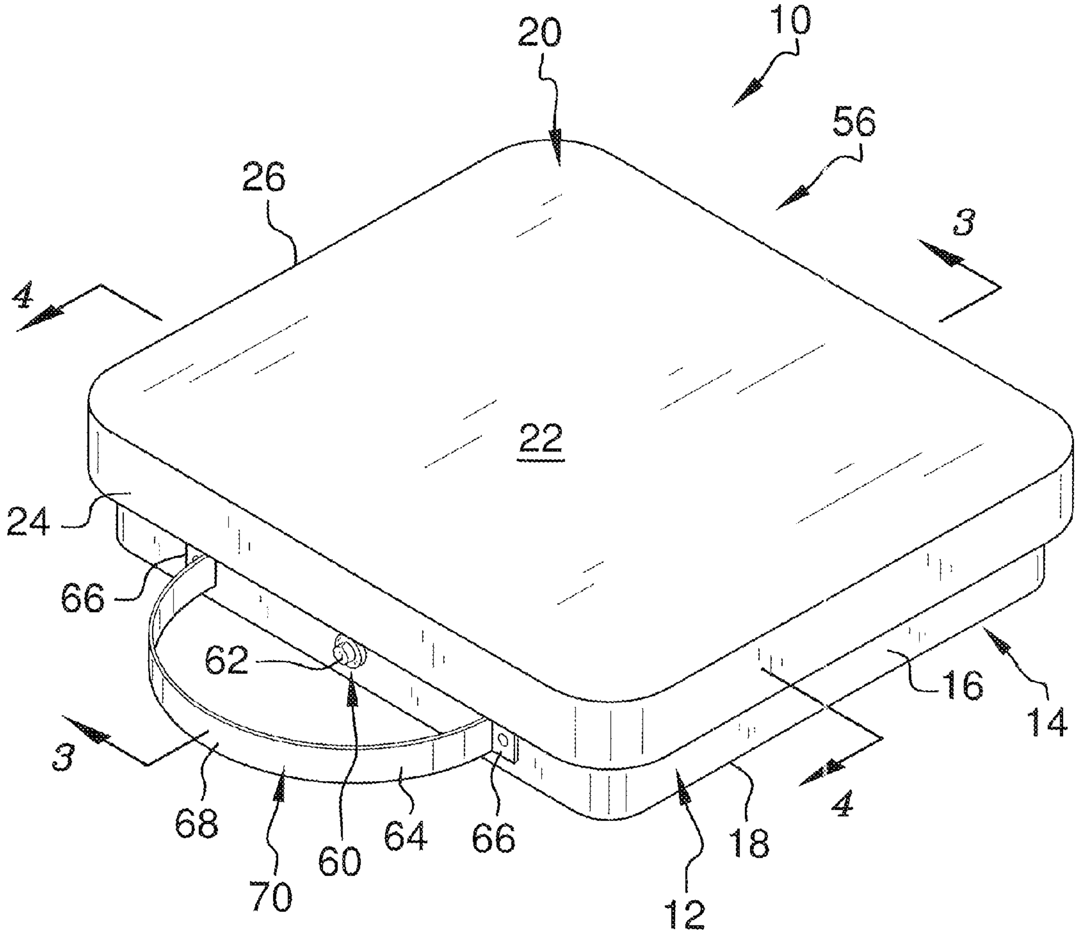
FIG. 1 is a top front side perspective view of a portable lift facilitation assembly according to an embodiment of the disclosure.
Figure 2:
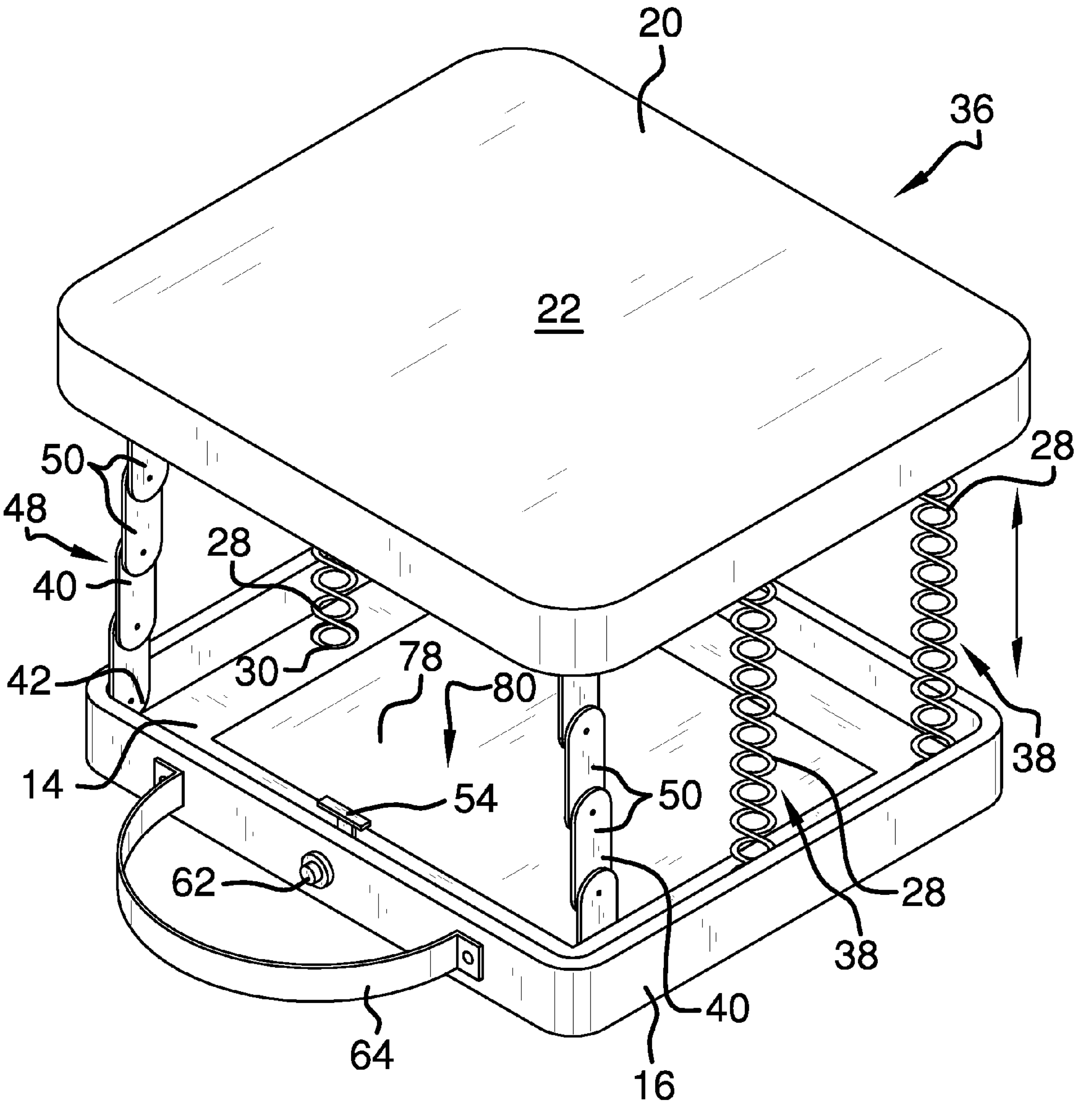
FIG. 2 is a top front side perspective view of an embodiment of the disclosure in an extended position.
Figure 3:
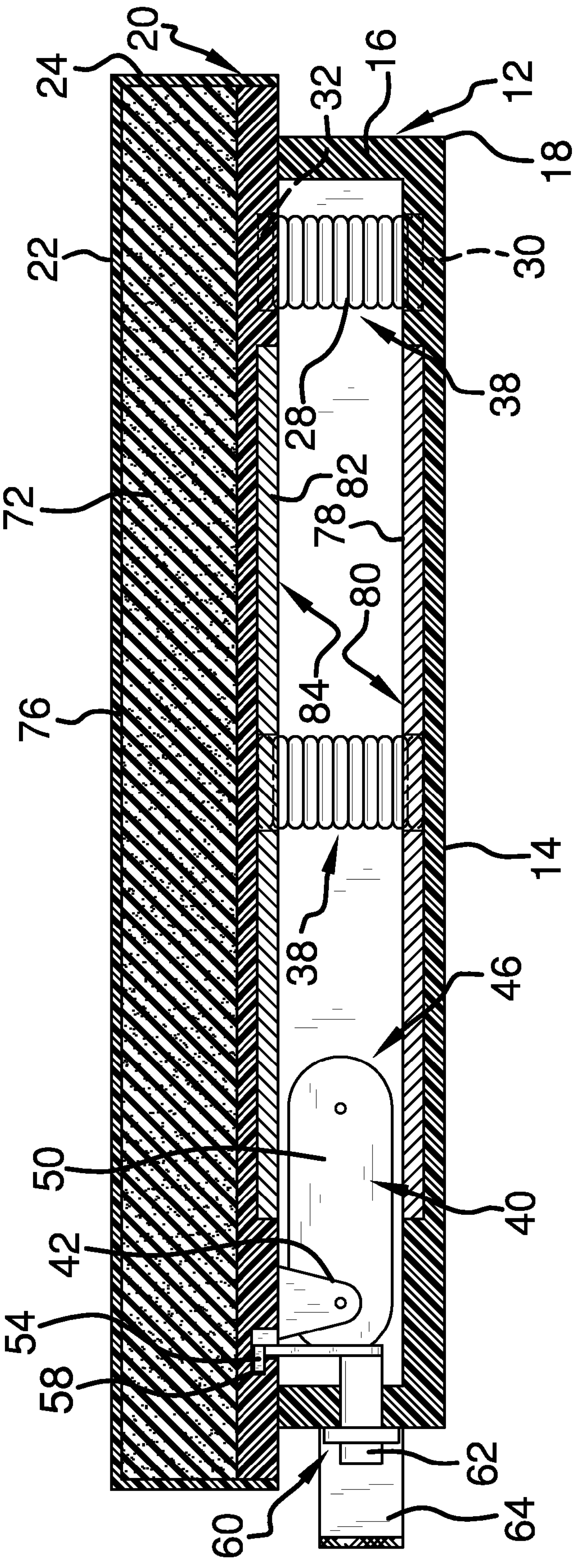
FIG. 3 is a cross-sectional view of an embodiment of the disclosure taken along line 3-3 of FIG. 1.
Figure 4:
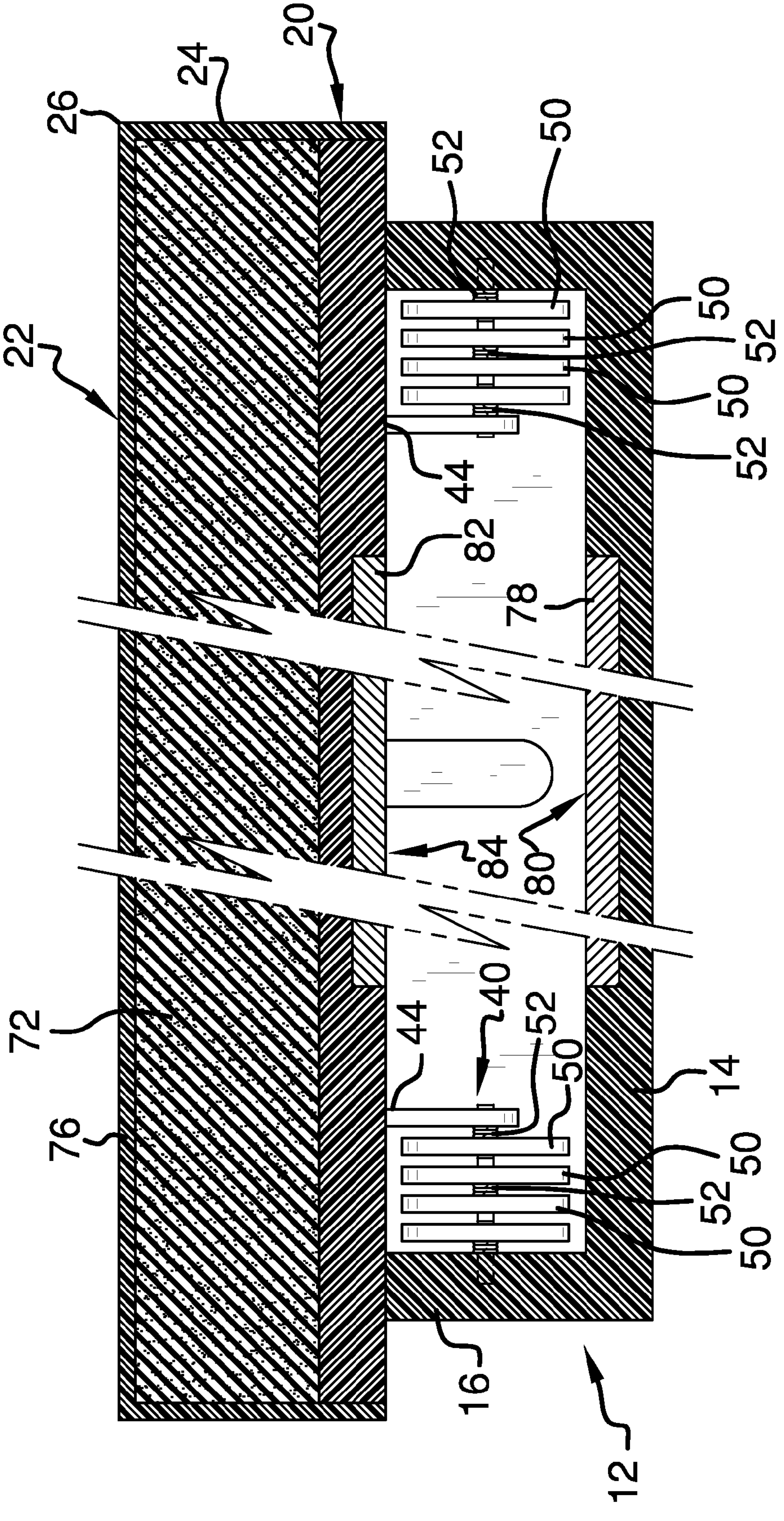
FIG. 4 is a cross-sectional view of an embodiment of the disclosure taken along line 4-4 of FIG. 1.

With reference now to the drawings, and in particular to FIGS. 1 through 4 thereof, a new lift facilitating device embodying the principles and concepts of an embodiment of the disclosure and generally designated by the reference numeral 10 will be described.

As best illustrated in FIGS. 1 through 4, the portable lift facilitation assembly 10 generally comprises a base 12 having a substantially planar bottom surface 14 and a perimeter wall 16 coupled to and extending upwardly from a perimeter edge 18 of the bottom surface 14. A top 20 has a substantially planar top surface 22 and a peripheral wall 24 coupled to and extending downwardly from a peripheral edge 26 of the top surface 22. At least one biasing member 28 is provided. Each biasing member 28 has a lower end 30 coupled to the base 12 and an upper end 32 coupled to the top 20. The biasing member 28 urges the top 20 away from the base 12 into an extended position 36. There may be a plurality of biasing members 28 positioned in spaced relationship on the base 12 and extending to corresponding positions on the top 20 keeping the top 20 and base 12 substantially aligned when in the extended position 36. Each biasing member 28 may be a helical spring 38. Each of a pair of extension arms 40 has a bottom end 42 coupled to the base 12 and a top end 44 coupled to the top 20. Each extension arm 40 is extendable between a retracted position 46 and an elongated position 48. Each extension arm 40 may comprise a plurality of tabs 50 pivotally coupled together in series from the bottom end 42 of the extension arm 40 to the top end 44 of the extension arm 40. Each of a plurality of tensioners 52 may be coupled to an associated adjacent pair of the tabs 50. The tensioners 52 may comprise leaf springs or the like. Thus, the tabs 50 of each extension arm 40 are rotationally biased to urge each respective extension arm 40 into the elongated position 48.

A latch 54 is coupled to the base 12. The latch 54 is engageable to the top 20 wherein the latch 54 selectively secures the top 20 to the base 12 with the extension arms 40 in the retracted position 46 and the biasing members 28 in a compressed position 56. The latch 54 may extend upwardly from the perimeter wall 16 of the base 12. The latch 54 extends into and engages a recess 58 extending into the top 20 wherein the latch 54 retains the top 20 in a static position relative to the base 12. A release 60 is coupled to the base 12. The release 60 is operationally coupled to the latch 54 for selectively releasing the latch 54 from the top 20 wherein the biasing members 28 urge the top 20 into the extended position 48. The release 60 may be a button 62 coupled to the latch 54 wherein he latch 54 is released from the top 20 when the button 62 is pressed.

A strap 64 may be provided having opposite ends 66 coupled to the perimeter wall 16 of the base 12. A medial section 68 of the strap 64 extends between the opposite ends 66 of the strap 64 defining a handle 70. The handle 70 may be positioned to extend over the release 60 facilitating manipulation of the release 60 by providing an opposing surface to press against while manipulating the release 60.

A pad 72 may be coupled to the top 20. The pad 72 may be coextensive with the top surface 22 of the top 20 providing cushioning and enhancing comfort for a person resting on the top surface 22. A cover 76 may be coupled to and extending over the pad 72 and down around the peripheral wall 24 of the top 20.

A base support plate 78 may be coupled to the base 12 extending through a medial section 80 of the base 12 to strengthen the base 12. Similarly, a top support plate 82 may be coupled to the top 20. The top support plate 82 extends through a medial portion 84 of the top 20 and may be substantially aligned with the base support plate 78.

In use, the assembly 10 is placed under a seated person who needs assistance rising from the seated position. The release 60 is manipulated urging the top 20 upwardly away from the base 12 providing lift to the person. After the person has been lifted, the top 20 may be depressed back towards the base 12 to reengage the latch 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A portable lift facilitation assembly comprising:

a base having a substantially planar bottom surface and a perimeter wall coupled to and extending upwardly from a perimeter edge of said bottom surface;

a top having a substantially planar top surface and a peripheral wall coupled to and extending downwardly from a peripheral edge of said top surface;

a biasing member having a lower end coupled to said base and an upper end coupled to said top, said biasing member urging said top away from said base into an extended position;

a pair of extension arms, each of said extension arms having a bottom end coupled to said base and a top end coupled to said top, each said extension arm being extendable between a retracted position and an elongated position, each said extension arm comprising a plurality of single tabs pivotally coupled together in series from said bottom end of said extension arm to said top end of said extension arm;

a latch coupled to said base, said latch being engageable to said top wherein said latch selectively secures said top to said base with said extension arms in said retracted position and said biasing member in a compressed position; and a release coupled to said base, said release being operationally coupled to said latch for selectively releasing said latch from said top wherein said biasing member urges said top into said extended position.

2. The assembly of claim 1, further comprising said release being a button coupled to said latch, said latch being released from said top when said button is pressed.

3. The assembly of claim 1, further comprising a strap having opposite ends coupled to said base, a medial section of said strap extending between said opposite ends of said strap defining a handle.

4. The assembly of claim 1, wherein said biasing member being a helical spring.

5. The assembly of claim 1, further comprising a plurality of tensioners, each said tensioner being coupled to an associated adjacent pair of said tabs wherein said tabs of each said extension arm are rotationally biased to urge each respective said extension arm into said elongated position.

6. The assembly of claim 1, further comprising a pad coupled to said top said pad being coextensive with said top surface of said top.

7. The assembly of claim 6, further comprising a cover coupled to and extending over said pad.

8. The assembly of claim 1, further comprising a base support plate coupled to said base, said base support plate extending through a medial section of said base.

9. The assembly of claim 1, further comprising a top support plate coupled to said top, said top support plate extending through a medial portion of said top.

10. The assembly of claim 1, further comprising:

said latch extending upwardly from said perimeter wall of said base; and said latch extending into and engaging a recess extending into said top wherein said latch retains said top in a static position relative to said base.

11. A portable lift facilitation assembly comprising:

a base having a substantially planar bottom surface and a perimeter wall coupled to and extending upwardly from a perimeter edge of said bottom surface;

a top having a substantially planar top surface and a peripheral wall coupled to and extending downwardly from a peripheral edge of said top surface;

a biasing member having a lower end coupled to said base and an upper end coupled to said top, said biasing member urging said top away from said base into an extended position, said biasing member being one of a plurality of said biasing members, said biasing members being positioned in spaced relationship on said base, each said biasing member being a helical spring;

a pair of extension arms, each of said extension arms having a bottom end coupled to said base and a top end coupled to said top, each said extension arm being extendable between a retracted position and an elongated position, each said extension arm comprising a plurality of tabs pivotally coupled together in series from said bottom end of said extension arm to said top end of said extension arm;

a latch coupled to said base, said latch being engageable to said top wherein said latch selectively secures said top to said base with said extension arms in said retracted position and said biasing member in a compressed position, said latch extending upwardly from said perimeter wall of said base, said latch extending into and engaging a recess extending into said top wherein said latch retains said top in a static position relative to said base;

a release coupled to said base, said release button being operationally coupled to said latch for selectively releasing said latch from said top wherein said biasing member urges said top into said extended position, said release being a button coupled to said latch, said latch being released from said top when said button is pressed;

a strap having opposite ends coupled to said base, a medial section of said strap extending between said opposite ends of said strap defining a handle;

a plurality of tensioners, each said tensioner being coupled to an associated adjacent pair of said tabs wherein said tabs of each said extension arm are rotationally biased to urge each respective said extension arm into said elongated position;

a pad coupled to said top said pad being coextensive with said top surface of said top;

a cover coupled to and extending over said pad;

a base support plate coupled to said base, said base support plate extending through a medial section of said base; and a top support plate coupled to said top, said top support plate extending through a medial portion of said top.

* * * * *